United States Patent [19]

Piper et al.

[11] 4,212,612
[45] Jul. 15, 1980

[54] APPARATUS FOR ENCLOSING A PLURALITY OF CONDUCTORS IN A PARTITIONED JACKET

[75] Inventors: George F. Piper, Baltimore; William C. Vesperman, Bel Air; Max K. Wilson, Cockeysville, all of Md.

[73] Assignee: Western Electric Company, Inc., New York, N.Y.

[21] Appl. No.: 55,129

[22] Filed: Jul. 5, 1979

Related U.S. Application Data

[62] Division of Ser. No. 943,425, Sep. 15, 1978.

[51] Int. Cl.² ............................................... B29F 3/10
[52] U.S. Cl. ..................................... 425/114; 425/113; 425/461
[58] Field of Search ...................... 264/174; 174/113 R, 174/117 R, 117 F, 117 FF; 425/113, 114, 461; 339/64 M, 91 R, 103 M; 428/379, 463

[56] References Cited

U.S. PATENT DOCUMENTS

| | | | |
|---|---|---|---|
| 919,384 | 4/1909 | Runzel | 174/117 R |
| 1,823,982 | 9/1931 | Lodge | 174/117 R |
| 2,105,812 | 1/1938 | Gordon et al. | 425/114 |
| 2,149,002 | 2/1939 | Wermine | 425/114 |
| 2,155,060 | 4/1939 | Phillips | 425/114 |
| 2,471,752 | 5/1949 | Ingmanson | 425/114 |
| 2,659,932 | 11/1953 | McNamee | 425/114 |
| 2,766,480 | 10/1956 | Henning | 425/114 |
| 2,778,059 | 1/1957 | Henning et al. | 425/114 |
| 2,979,431 | 4/1961 | Perrault | 425/114 |
| 3,361,871 | 1/1968 | Brandt | 264/174 |
| 3,404,432 | 10/1968 | White et al. | 425/114 |
| 3,699,498 | 10/1972 | Hardesty et al. | 339/64 M |
| 3,728,424 | 4/1973 | Bauer | 264/174 |
| 3,860,316 | 1/1975 | Hardesty et al. | 339/91 R |
| 3,860,686 | 1/1975 | Myers | 264/174 |
| 3,935,369 | 1/1976 | George et al. | 428/379 |
| 4,050,867 | 9/1977 | Ferrentino et al. | 425/114 |
| 4,090,763 | 5/1978 | Congdon et al. | 339/103 M |
| 4,132,756 | 1/1979 | Ferrentino et al. | 264/174 |
| 4,166,881 | 9/1979 | Congdon et al. | 428/463 |

FOREIGN PATENT DOCUMENTS 51-26465  8/1976  Japan .................................. 264/174

*Primary Examiner*—Jay H. Woo
*Attorney, Agent, or Firm*—E. W. Somers

[57] ABSTRACT

In the manufacture of cordage (25), at least two groups (28, 29) of individually insulated, flexible conductors (21—21) which comprise a planar array (40) are moved through a core tube (71) of an extruder (27) in adjacent paths. As the groups are moved out of an exit portion of the core tube where they are spaced apart a predetermined distance and along converging paths to a die, a first plastic material is flowed about the array to enclose it and to be formed into a jacket by the die. Portions of the first plastic material flow between the groups to achieve an equilibration of pressure in the plastic material about each group, which controls the direction and magnitude of lateral movement of each group within the plane of the array, and to form a web (41) which is integral with the jacket and which may vary in thickness along its length to compensate for changes in the outside diameter of the insulated conductors. The control of the lateral movement of each group between the core tube and the die and the formation of a web results in a jacket having substantial symmetry and in cordage having the groups separated by the web which has a thickness that is substantially less than the predetermined distance. The jacket is coated with a second plastic material which has a stiffness modulus that is substantially greater than that of the first plastic material.

5 Claims, 7 Drawing Figures

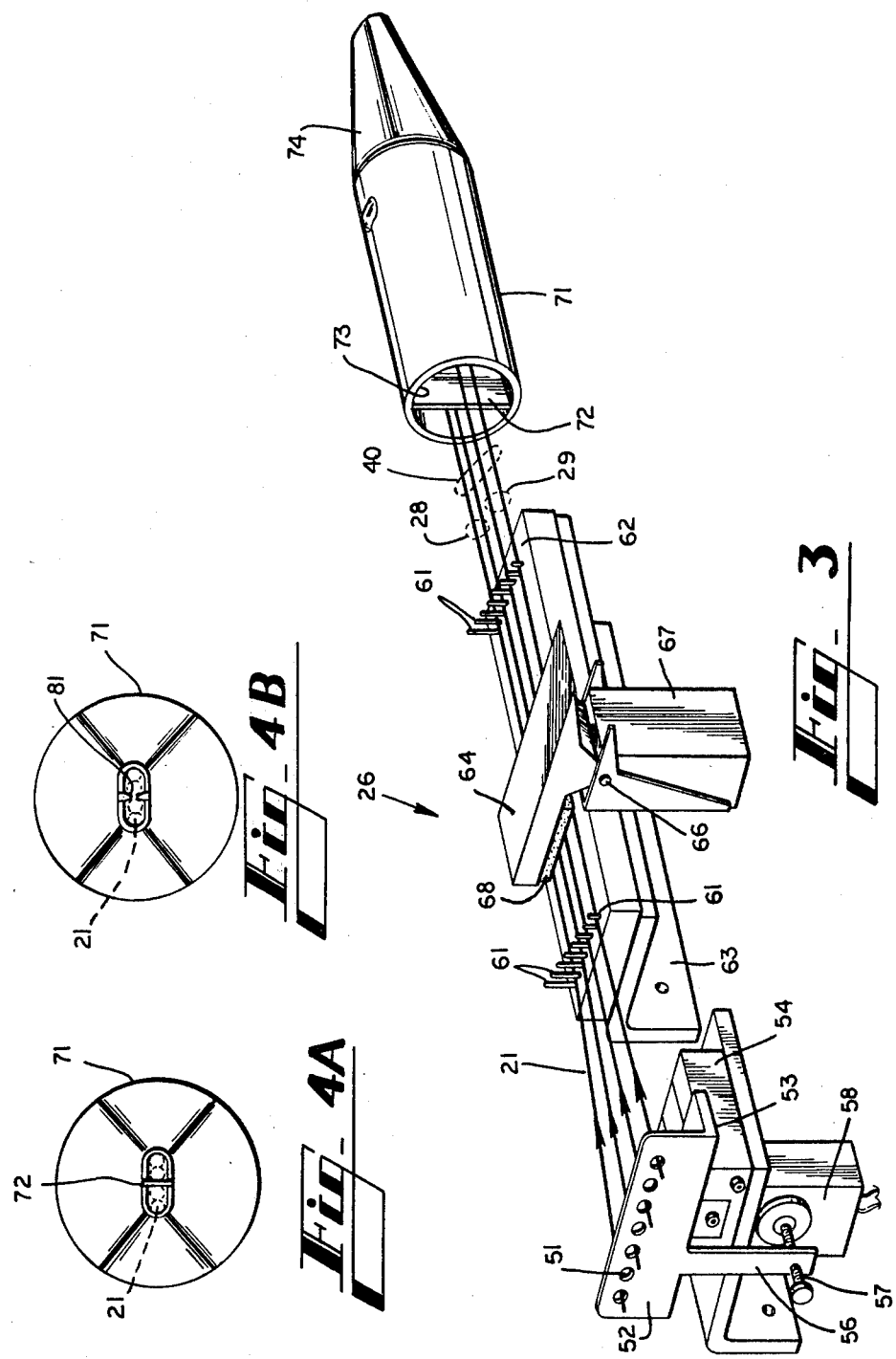

APPARATUS FOR ENCLOSING A PLURALITY OF CONDUCTORS IN A PARTITIONED JACKET

This is a division of application Ser. No. 943,425 filed Sept. 15, 1978.

TECHNICAL FIELD

This invention relates to apparatus for enclosing a plurality of conductors in a partitioned jacket. More particularly, the invention relates to methods of and apparatus for manufacturing a telephone cord by enclosing at least two groups of relatively flexible, individually insulated conductors which are disposed in a planar array in a common, substantially symmetrical jacket that is joined by a web between the groups.

BACKGROUND OF THE INVENTION

Present day telephone cords are made with individually insulated conductors disposed in a planar array and enclosed in a common jacket which comprises a plasticized polyvinyl chloride (PVC) composition. Each conductor is generally made with a center filamentary core having a plurality of tinsel ribbons wrapped spirally thereabout and is highly flexible relative to a solid or stranded wire conductor. Modular plugs such as those shown in U.S. Pat. Nos. 3,699,498 and 3,860,316, for example, are used to terminate the cords so that they can be easily connected to modular jacks within telephone housings or wall terminals.

A cord which is used to connect a base or housing and a handset portion of a telephone is referred to as a retractile or spring cord and is made from a length of cordage which is helically wound in a plurality of convolutions while that which is used to connect the housing to a wall terminal is called a line cord and comprises a length of unwound cordage. In recent years, a substantial number of telephone cords, both retractile and line, have been made with a clear, as opposed to a colored, opaque jacket.

In order to improve the resistance of telephone cords, especially the clear ones, to contaminants, to wear, and to unsightly staining during use, the PVC is coated with a plastic barrier which comprises a polyester composition that is applied to the top or external surface of the cord jacket. A polyester plastic which results in a superior external coating is disclosed and claimed in application Ser. No. 864,159 filed Dec. 27, 1977 in the names of W. I. Congdon, J. J. Mottine and W. C. Vesperman, and incorporated by reference hereinto.

Several problems have surfaced during the manufacture and use of jacket-coated cords and, in particular, of jacket-coated, retractile cords. While the top coating stiffens and prevents contamination of the cord jacket, the repeated extension and retraction of the cord causes the coating to be lifted away from the jacket and to crinkle. The crinkling of the coating, which occurs because the stiffness modulus of the coating material is substantially greater than that of the jacket, results in an unsightly rippled jacket surface and neutralizes the aesthetic value provided by the clear jacket.

Because of the extension and retraction of the convolutions of a retractile cord during customer use, the cord cross-section tends to assume an oval configuration rather than one with the conductors in a planar array. It is important that the conductors be disposed and maintained in a planar array in a predetermined orientation; otherwise, end sections of the cordage may not mate with receiving openings in modular terminating plugs such as, for example, those described in aforementioned U.S. Pat. Nos. 3,699,498 and 3,860,316 which issued on Oct. 17, 1972 and Jan. 14, 1975, respectively. Also, when used cords are refurbished, any reorientation of the conductors would cause discontinuities upon retermination of the cordage with plugs.

Another problem relates to the symmetry of the cord cross section with respect to x-y coordinate axes and, in particular, to the jacket wall thickness adjacent the outermost conductors in the array. A lack of control of wall thickness as the jacket is extruded over the array results in cordage which, if used to make retractile cords, is susceptible to splitting. Further, insufficient or unsymmetrical jacket wall thickness, especially with respect to the outermost conductors, results in a defect called herniation in which a protrusion develops in the outer surface of the jacket.

Unsymmetrical jacket wall thickness is caused by variation in the outside diameter of one or more of the insulated conductors. Plastic for conductor insulation, such as that shown, for example in U.S. Pat. No. 4,090,763, which issued May 23, 1978 in the names of W. I. Congdon, J. J. Mottine and W. C. Vesperman, is extremely sensitive to temperature change and will vary in size in the absence of suitable temperature control. Also, imperfections in the tinsel ribbon conductors make it more difficult to control the outside diameter of the insulation than that of a solid wire.

The non-uniformity of the thickness of the jacket on the side of each of the outermost conductors in the planar array is also caused by the shifting of the relatively flexible, tinsel ribbon conductors in a cavity of the extruder between the core tube and die because of flow imbalance conditions in the plastic material about the array. These conditions which are characterized, for example, by differences in pressure are discussed in U.S. Pat. Nos. 2,766,480, 2,778,059 and 3,860,686 with respect to a single conductor. The problem of flow imbalance is magnified when an array of relatively flexible conductors is to be jacketed.

The lateral shifting of the conductors can be controlled somewhat by the use of an individual core tube passageway for each conductor. However, in the event of a conductor break prior to entry into the core tube, the unbroken conductors as well as the leading portion of the broken conductor would continue to be advanced, thereby permitting plastic material to enter the passageway associated with the broken conductor. Restringing of the broken conductor would require that the manufacturing line be shut down so that the associated core tube can be cleaned. On the other hand, if the conductors are advanced through a single passageway core tube wherein they are arrayed contiguously and a conductor break occurs, the broken conductor would be moved along through the remainder of the core tube by frictional engagement with the unbroken ones. This permits a restringing operation to be carried out during a brief period of reduced line speed instead of requiring a complete shut down of the line. Although the use of a single passageway core overcomes one problem relating to line breaks, the conductors 21—21 arrayed contiguously are susceptible to lateral shifting which results in cordage having an unsymmetrical jacket.

The known prior art includes U.S. Pat. No. 919,384 which shows a plurality of cables in a planar array with a separator between at least two adjacent cables and stitched to the jacket. In U.S. Pat. No. 2,659,932, a ground strand, which is interposed between two parallel, insulated conductors, is covered, after which the conductors and covered ground strand are enclosed with an insulating material. An apparatus shown in U.S. Pat. No. 4,050,867, is used during extrusion to maintain a constant distance between wires or optical fibers of a telephone cable by causing the wires or fibers to be moved through an extrusion head along precisely defined paths. In these last two mentioned patents, a plastic material is formed between the conductors prior to their enclosure in a common jacket.

The prior art also includes a product known as drop wire which connects outside telephone plant to a customer's premises. In the manufacture of drop wire, two relatively stiff, copper-clad, steel wires are advanced through separate passageways in a core tube of an extruder with the spacing between the passageways being substantially the same as the spacing between the wires after they have passed through the extruder die.

The prior art does not seemingly offer a solution to the problem of how to produce a telephone cord which includes a plurality of relatively flexible conductors that are arrayed in a single layer during manufacture, maintained in such a configuration during use, and enclosed with a substantially symmetrical, coated jacket.

SUMMARY OF THE INVENTION

The foregoing problems of prior art cordage are overcome by cordage having a partitioned, coated jacket which is made in accordance with the apparatus of this invention, in which at least two groups of conductors disposed in a planar array are moved along adjacent paths which extend through a core tube of an extruder. Portions of the paths at least immediately adjacent the exit end of the core tube are such that the groups are spaced apart a predetermined distance. Then the groups of conductors are moved in paths along which each group is capable of being moved laterally within the plane of the array and along which a first plastic material is flowed about the array to enclose it in a jacket formed by a die of the extruder. Simultaneously, portions of the first plastic material flow between the two groups of conductors to achieve an equilibration of pressure about each group and to form a web or partition which is integral with the jacket. The equilibration of the pressure, which controls the wandering of the groups within the array as they are being enclosed in the jacket, and the formation of the web, having a thickness that may vary along its length to accommodate conductor size variation and that is substantially less than the predetermined distance, result in cordage having substantial symmetry in cross-section with respect to x-y coordinate axes. A second plastic material having a substantially greater stiffness modulus than the first plastic material is coated over the jacket and prevents plasticizer migration from the first plastic material as well as degradation of the cord from external elements. The substantial symmetry of the cord cross-section together with the web provides the cord with excellent crush resistance, prevents any change in cross section during use, and prevents crinkling of the coating as well as separation of the coating from the jacket.

In an apparatus which embodies the principles of this invention, a core tube in an extruder crosshead includes means for spacing the groups of conductors apart a predetermined distance as they are launched into a cavity of the crosshead where they are free to be moved laterally by a plastic material that is being forced into the cavity. A pressure-type die of the extruder is spaced from the core tube a distance which is sufficient to permit an equilibration of the pressure of the first plastic material about each group and a movement of the groups toward each other until they are separated by a web which is formed therebetween and which has a thickness substantially less than the predetermined distance.

BRIEF DESCRIPTION OF THE DRAWINGS

Other features of the present invention will be more readily understood from the following detailed description of specific embodiments thereof when read in conjunction with the accompanying drawings, in which:

FIG. 3 is a perspective view of a portion of the apparatus shown in FIG. 1;

FIGS. 4(A) and (B) are enlarged end views of a preferred embodiment of a core tube and an alternative embodiment, respectively, which is used in the extruder shown in FIG. 1.

DETAILED DESCRIPTION

Figure 1:
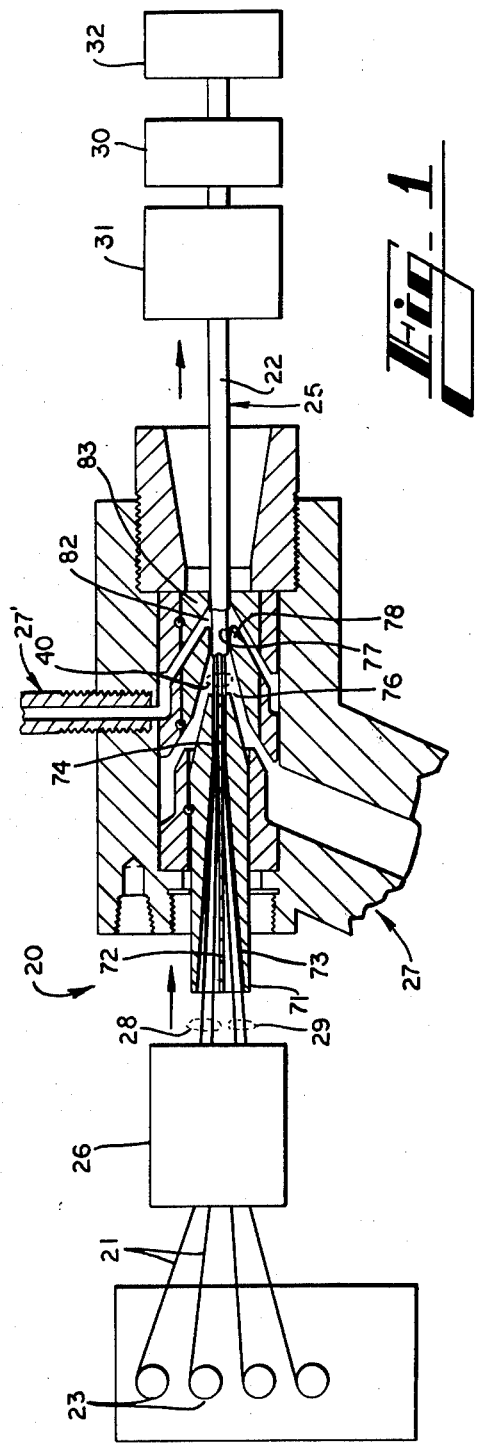
FIG. 1 is an overall view of an apparatus in accordance with this invention for enclosing at least two groups of conductors in a planar array in a jacket having an internal partition and substantial symmetry.

In FIG. 1, there is shown an overall view of an apparatus, designated generally by the numeral 20, for enclosing a plurality of individually insulated conductors 21—21 in a jacket 22 to form cordage 25. The apparatus 20 includes a plurality of barrel supplies 23—23 of insulated, relatively flexible conductors 21—21 which are advanced through a detector-separator 26 that detects oversize portions of the insulated conductors and separates the conductors into two groups 28 and 29. Then the two groups 28 and 29 of conductors 21—21 are moved by a capstan 30 through extruders 27 and 27' with associated dies in a common crosshead where they are enclosed in a coated jacket 22, through a cooling trough 31, and to a barrel take-up 32. While the principles of this invention are described in terms of making cordage 25 which includes two groups of conductors, the invention is not so limited and may be used to enclose more than two groups of conductors, or groups in which the conductors are spaced apart within each group.

Figure 2A:
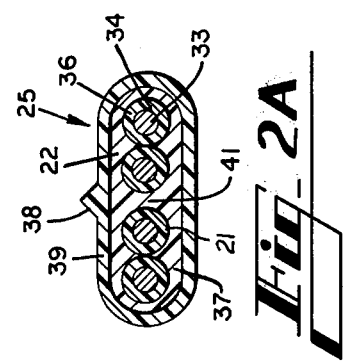
FIGS. 2(A) and (B) are detailed views in end section of a telephone cord made with the apparatus of FIG. 1 and a prior art telephone cord, respectively, with the thickness of a coating over the jacket being enlarged for purposes of clarity.

The cordage 25 produced by the apparatus is shown in FIG. 2(A) and includes a plurality of the individually insulated conductors 21—21. Each of the conductors 21—21 comprises a center nylon core 33, a plurality of tinsel ribbons 34—34 wrapped spirally thereabout, and an insulation cover 36 such as that disclosed and claimed in priorly identified U.S. Pat. No. 4,090,763.

Figure 2B:
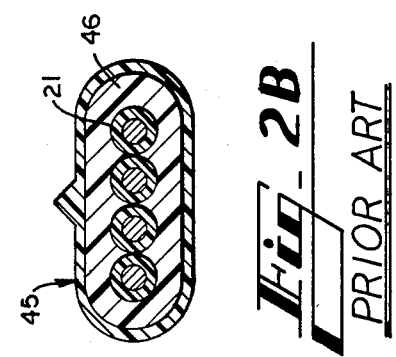

The cordage 25 as well as the prior art cordage 45 (see FIG. 2(B)) includes a jacket 22 made of a first plastic material, and covered with a layer 39 of a second plastic material, having an identification ridge 38. However, unlike the prior art cordage 45, the cordage 25 having the two groups 28 and 29 of conductors 21—21 that comprise an array 40 also includes a web 41 which provides the cord with improved strength characteristics as well as unexpectedly preventing crinkling of the coating 39.

Referring now to FIG. 3 for a detail view of a portion of the apparatus, it can be seen that the conductors 21—21 from the barrel supplies 23—23 are moved through sizing bushings 51—51 in one arm 52 of a bracket 53 of the break detector and separator 26. The bracket 53 is slidably mounted on a block 54 and has a downwardly depending arm 56 having a switch actuator 57 extending therefrom. A defect in a conductor 21, which manifests itself as an enlargement along its length, is precluded from passing through its associated bushing 51 and causes the bracket 53 to be moved to the right, as viewed in FIG. 3, under line tension. This causes the switch actuator 57 to engage a microswitch 58 which discontinues the movement of the block 54 causing the defective conductor to break. The engagement of the microswitch 58 also operates circuitry (not shown) to alert an operator and to reduce the operating line speed and the speed of the extruders 27 and 27' to minimize scrap while the break is repaired.

As the section of defective cordage travels through the apparatus 20, it is detected by a gauge (not shown) which causes the cordage distribution at the barrel takeup 32 to be discontinued. The operator then removes the defective cordage which is readily distinguishable because of its lack of distribution.

From the detector 26, the conductors 21—21 are moved between pins 61—61 upstanding from a surface 62 mounted on a support 63. Between the two sets of pins 61—61 is an arm 64 which spans over the conductors 21—21 from a pivotal mounting 66 on a post 67. The arm 64 is provided with a strip 68 of felt material which engages the conductors 21—21 to maintain them in an array without inadvertent crossover and to control the tension imparted to the conductors to assist in the maintenance of proper conductor alignment and in the reduction of conductor vibration. As the conductors 21—21 exit from the break detector and separator 26, they are disposed in a planar array in the two groups 28 and 29 in preparation for their entry into a core tube 71 of the extruders 27 and 27'. The term "planar array" is intended to mean that centers of the conductors in cross-section lie generally in a plane as shown in FIG. 2(A).

As can be seen in FIG. 3, the conductors 21—21 are moved into the core tube 71 of the extruder 27 in the two groups 28 and 29 with each group being on one side of a locator or separator plate 72. The separator plate 72 is made of a material such as stainless steel, is about 0.038 cm thick and extends throughout the length of the core tube. An opening 73 through the core tube 71 is tapered (see also FIG. 4(A)) for part of its length to guide the groups 28 and 29 of conductors 21—21 so that the conductors on each side of the separator plate 72 adjacent to a forward end 74 of the core tube are contiguous. The core tube 71 and the plate 72 are effective to cause the groups 28 and 29 to be spaced apart a predetermined distance of about 0.038 cm as they are moved out of the core tube.

The conductors 21—21 are moved from the core tube 71, where they are laterally confined, through a cavity 76 (see FIGS. 1 and 5) of the extruder 27 wherein they are enclosed in the jacket 22 of a first plastic material, which comprises a plasticized PVC, and then through an opening 77 of a first pressure-type die 78 which sizes the jacket. Such a plasticized PVC composition is disclosed and claimed, for example, in commonly assigned application Ser. No. 888,254 filed Mar. 17, 1978 in the names of W. Sparzak and W. C. Vesperman, now U.S. Pat. No. 4,123,585, and incorporated by reference hereinto.

As the array 40 is moved out of the core tube 71, the first plastic material is forced into the cavity 76 and flowed about the array with portions of it flowing between the groups 28 and 29 to form the web 41. The thickness of the web 41 is capable of varying in thickness to compensate for changes in the outside dimensions of the insulated conductors 21—21. Instead of having to compensate for these variations in the outer jacket wall as in the prior art cordage 45, the cordage 25 manufactured by the apparatus 20 advantageously is capable of absorbing dimension changes internally, thereby minimizing the occurrence of an unsymmetrical jacket.

The web 41 imparts additional strength to the cordage 25, such as, for example, additional crush resistance, prevents inadvertent crossover of the conductors 21—21, and mitigates against the tendency of the cordage, which is referred to as "flat", from being changed into an oval or circular configuration. As will be recalled, inadvertent conductor crossover and configuration change cause problems when cordage is refurbished and reterminated with modular plugs, because the retermination requires the conductors to be disposed in a predetermined ordering in a planar array.

The flow of the first plastic material between the groups 28 and 29 also provides an unexpected advantage in that it tends to achieve an equilibration of pressure about each group in the cavity 76. The pressure in the first plastic material between the groups 28 and 29 increases to equal that on the lateral side of each group. The equilibration or balancing of the pressure controls the lateral shifting of each of the groups 28 and 29 as the jacket 22 is being formed thereover so that the final spacing of the groups is equal to the desired thickness of the web.

Figure 5:
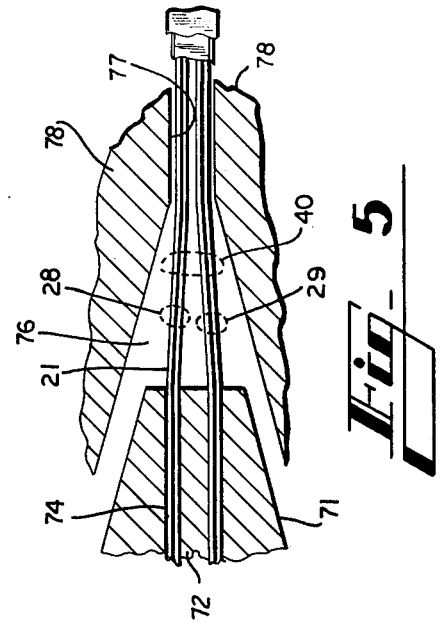
FIG. 5 is an enlarged view of a portion of an extruder crosshead to show the paths of the conductors from the exit end of the core tube to a jacketing die.

Referring now to FIG. 5, it should be appreciated that as the conductors 21—21 emerge from the core tube 71, the pressure in the first plastic material as it enters the cavity 76, e.g. in the range of $5.6 \times 10^9$ to $8.4 \times 10^4$ grams/cm$^2$, causes the two groups 28 and 29 to converge as they are moved toward the die 78 until an equilibration of pressure is achieved and a web, having a thickness in a preset range, separates the groups. The distance of the core tube 71 from the die 78 must be such that it cooperates with the equilibration of flow conditions in the first plastic material to permit the groups 28 and 29 to be moved together a sufficient distance so that the overall external width of the jacket and the thickness of the web are within preset ranges. It should be observed that the web 41 which separates the groups 28 and 29 in the jacketed array has a thickness that is substantially less than the predetermined distance which separates the groups as they are moved out of the core tube 71. For example, while the groups 28 and 29 are separated by about 0.038 cm within the core tube 71, the web thickness in the finished cordage is from about 0.0076 to 0.0127 cm, depending on conductor variation.

As a result of the foregoing arrangement, the jacket 22 of the cordage 25 which is made in accordance with this invention has substantial symmetry. Substantial symmetry of the jacket 22, especially that of retractile cords is required in order to prevent the development of herniations or jacket splitting during use. It should be understood that symmetry refers to a jacket 22 in which correponding portions of the cord on each side of an x or y axis are covered with substantially the same thickness of the first plastic material. However, the thickness of the plasticized PVC which comprises the jacket 22 above and below the array 40 as shown in FIG. 2(A) is generally greater, e.g. 0.064 cm, than that, e.g. 0.038 cm, covering the side of an outermost conductor 21.

The prior art cordage 45 (see FIG. 2(B)) which does not include the web 41 has been found wanting in substantial symmetry. Conductor variations are taken up in outside portions of the jacket 22 which results in one side of the array having a thicker covering than the other side. Also, an unsymmetrical jacket in the prior art cordage 45 is caused by an uncontrolled shifting of the groups 28 and 29 of the array 40. This occurs because just prior to the groups 28 and 29 conductors 21—21 being jacketed, they may be moved within the mass of plastic in the extruder crosshead by any imbalance of flow conditions such as, for example, pressure.

The preferred embodiment of the invention has been described in terms of using a core tube 71 having a separator 72; however, other arrangements may also be used as long as the groups 28 and 29 are spaced apart a predetermined distance at the exit or downstream end of the core tube. This insures that the groups 28 and 29 are launched into the unsupported length of travel between the core tube 71 and the die 78 spaced apart the predetermined distance so that the resulting web 41 is within a specified range. Such control is necessary since lengths of the cordage 25 are subsequently terminated with modular plugs (not shown) having terminals spaced on centers so that they engage the tinsel conductors 34—34. The array spacing may be accomplished by constructing the core tube 71 to include a pair of inwardly formed ribs 81—81 (see FIG. 4 (B)) which may only be required adjacent the exit end of the core tube.

After the jacketed array 40 is moved through the die 78, it enters a cavity 82 of a die 83 of the extruder 27' in which it is covered with the layer 39 of a second plastic material that in the finished cordage is about 0.008±0.005 cm thick. It will be recalled that the second plastic material, which is, for example, a polyester blend material disclosed and claimed in the aforementioned application Ser. No. 864,159, provides the cord 25 with protection against degradation. The die 83 is notched to produce the finished cordage 25 with the tracer or identification ridge 38.

As disclosed in priorly identified application Ser. No. 864,159, superior top coatings for PVC are polyesters, especially a polyester blend of a terpolymer of tetramethylene glycol reacted with terephthalic acid, isophthalic acid and azelaic acid, and a copolymer of ethylene glycol reacted with terephthalic acid and sebasic acid. VAR 5825 is a code designation for a polyester blend of: (1) a terpolymer of tetramethylene glycol reacted with an acid mixture of 70% terepthalic acid, 10% isopthalic acid, and 20% azelaic acid and (2) a copolymer of ethylene glycol reacted with 50% terepthalic acid and 50% sebasic acid. The proportions of the reactants, both of which are available from Goodyear Tire and Rubber Company, can vary over ranges on the order of ±50% of the recited percentages within reasonable limits without affecting materially the functional properties of the polyester blend. The preparation of ingredient (1), which will be referred to as VAR 5126, is disclosed in U.S. Pat. No. 3,423,281, while that of ingredient (2), which will be referred to as VAR 415, appears in U.S. Pat. Nos. 2,765,250 and 2,765,251.

The polyester material which comprises the coating 39 has a significantly higher stiffness modulus as determined by A.S.T.M-D-747 than that of the jacket material. For example, the stiffness modulus of the coating 39 typically is in the range of 1757 to 2460 $kg/cm^2$ and preferably 1969 $kg/cm^2$, while that of the jacket 22 typically is in the range of 56 to 70 $kg/cm^2$, and preferably 70 $kg/cm^2$.

It will be recalled that one of the problems with the prior art coated cordage 45 is the crinkling of the coating, particularly in retractile cords. Unexpectedly, the coating 39 of a cord 25 which includes a web 41 does not crinkle notwithstanding the significant difference in stiffness moduli between the material of the coating and that of the jacket 22.

As the jacketed, coated array 40 is moved through the die 83, the coating 39 is sized; then the cordage 25 is air-dried, water-cooled, and taken up in the barrel 32. The cordage 25 which is provided in accordance with the principles of this invention has an overall width of about 0.5 cm and an overall height of about 0.24 cm. Each insulated conductor 21 has an outside dimension of about 0.10 cm, while the web 41 is about 0.013 cm thick and the thickness of the jacket material on each side wall of the jacket 22 is about 0.038 cm.

The cordage 25 is pulled by the belt capstan 30 under constant tension and then moves downwardly past a rotating paddle arrangement such as that disclosed and claimed in U.S. Pat. No. 3,135,038 issued June 2, 1964 in the name of W. G. Pflugrad to be distributed in the rotatably supported barrel takeup 32. The rotational speed of the paddle (not shown) and of the barrel 32 are adjustable to obtain a uniform distribution.

EXAMPLE

A jacketing extruder 27 for the first plastic material included an 8.9 cm diameter screw having a 24:1 L/D barrel which was divided into four zones which are individually heated and controlled for temperature in the range of 149° to 179° C. A 4:1 compression ratio screw having nine flights in the metering section, 8½ flights in a transition section, and 6½ flights in a feed section was used to process a plasticized PVC such as, for example, that disclosed and claimed in priorly identified application Ser. No. 888,254 filed Mar. 17, 1978. The extruder 27' for the polyester blend coating 39 included a 3.8 cm screw having a 30:1 L/D barrel divided into three individually heated and controlled zones which ranged in temperature from 177° C. to 188° C. The screw had a compression ratio of 3:5:1 with 9 flights in the feed section, 10 flights in the transition section, and 11 flights in the metering section. Both barrels fed into a common head in which a temperature of 182° C. was maintained. The extruders 27 and 27' were operated at a screw speed of about 30 rpm and the line speed was 1097 m/minute. A typical four conductor cordage 25 having a web 41 between the center two conductors 21—21 required a core tube 71 having an orifice of 0.11 cm×0.47 cm and a 0.04 cm metal separator to produce a 0.013 cm web.

A core tube 71 in the shape of a truncated cone and having an included angle of 30° was utilized to provide a streamline plastic flow which prevented the melt from backing out through the core tube and eased the reinsertion of broken conductor ends. The core tube 71 was spaced 1.89 cm from the PVC die 78.

The PVC die 78 had an oval orifice 70 which measured 0.241 cm×0.5 cm, a 0.48 cm die land length, and a 30° included interior angle. The PVC coverage produced cordage 25 which measured 0.22 cm×0.47 cm, thus generating an area reduction ratio of 1.19 to 1.

The second plastic material or polyester die 83 had an oval orifice which measured 0.38 cm×0.52 cm, a 0.32 cm die land length, and 60° included angle matching the 60° outer surface angle of the PVC die. This die arrangement produced a finished cordage product of 0.24 cm×0.5 cm and yielded an area reduction ratio of 1:53:1. The polyester die 83 was notched to produce a tracer or ridge 38 in the coated cordage which served as an orientation tool during end finishing. The draw down or area reduction created an operating pressure of 84.4 Kg/cm$^2$ which insured coating adhesion, insured coating uniformity, minimized cordage distortion, and minimized coating impregnation of the PVC jacket 22. The cooling water trough 31, which was spaced about 10.16 cms from the extruder 27', was designed to maintain the temperature of the quench water in the trough below about 28° C.

The coated clear cordage 25 incorporating the longitudinal PVC strength member or web 41 exhibited significant improvements in both physical properties and mechanical performance as compared to that of the uncoated design shown in FIG. 2 (B).

One piece modular plug pull-out strength was measured for both coated-webbed and uncoated cordage. The test utilized a continuously increasing load on a terminated modular plug. The coated-webbed cordage 25 exhibited a pull-out strength of $1.93 \times 10^7$ dynes compared to $1.38 \times 10^7$ dynes for the uncoated, non-webbed cordage 45. Coated-webbed cordage 25 demonstrated approximately 50% improvement in twist resistance, 50% improvement in scuff resistance over the uncoated non-webbed cordage 45, and an improvement of 280% in crush resistance.

Cordage 45 which was constructed with 0.010 cm to 0.015 cm of a polyester material having a 2,109 Kg/cm$^2$ stiffness modulus coated over a plasticized PVC jacket having a modulus of 56 Kg/cm$^2$ elongated approximately 10% under test. Upon extension of the coiled cordage 45, the higher stiffness modulus outer coating 39 distorted and lifted away from the insulated conductors 21—21 and the PVC jacket 22 thereby forming an irregular, wavy or crinkling surface.

Unexpectedly, the addition of the 0.013 cm web 41 between the conductor groups 28 and 29 resulted in the coated jacket flexing as a single entity without the surface distortions previously observed in the prior art cordage construction notwithstanding the use of two plastic materials having significantly different stiffness moduli.

It is understood that the above-described arrangements are simply illustrative of the invention. Other arrangements may be devised by those skilled in the art which will embody the principles of the invention and fall within the spirit and scope thereof.

What is claimed is:

1. An apparatus for enclosing at least two groups of insulated conductors, which are disposed in a planar array, in a common, substantially symmetrical jacket, said apparatus comprising:

means for causing at least two groups of individually insulated conductors which are disposed in a planar array to be moved in adjacent paths along at least an exit portion of which the groups are spaced apart a predetermined distance and then for causing the groups to be moved along converging paths in which each group of conductors is capable of being moved within the array; and means for flowing a plastic material about the array to enclose it in a jacket and between the groups to achieve an equilibration of pressure in the plastic material about each group and control lateral movement of the groups of conductors within the array while forming a web between the groups which is integral with the jacket and which may vary along the length of the array to compensate for conductor size variations, said means being effective to cause the web which separates the groups in the jacketed array to have a thickness which is substantially less than said predetermined distance.

2. The apparatus of claim 1, wherein the plastic material which is flowed about the array to form a jacket is a first plastic material and the apparatus further includes means for covering the jacket with a second plastic material that has a stiffness modulus which is substantially greater than that of the first plastic material.

3. The apparatus of claim 1, wherein the means for flowing the plastic material includes an extruder and the means for causing the groups of conductors to be moved in adjacent paths includes a core tube of the extruder, said core tube including means at least adjacent its exit end for maintaining the groups spaced apart said predetermined distance.

4. The apparatus of claim 3, wherein the means in the core tube includes a member which extends longitudinally within the core tube to space the groups apart said predetermined distance, said member having a thickness which is substantially greater than the thickness of the web.

5. The apparatus of claim 3, wherein the extruder includes a die which is spaced from the core tube a distance which is sufficient to permit the groups of conductors to be moved toward each other so that the thickness of the web is substantially less than said predetermined distance.

* * * * *